United States Patent
Hattori et al.

(10) Patent No.: US 7,429,039 B2
(45) Date of Patent: Sep. 30, 2008

(54) HINGE DEVICE, AUTOMATIC DOCUMENT FEEDER, SCANNING UNIT, AND IMAGE FORMING APPARATUS

(75) Inventors: Yoshiteru Hattori, Ichinomiya (JP); Atsuo Hirose, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 553 days.

(21) Appl. No.: 11/255,106

(22) Filed: Oct. 21, 2005

(65) Prior Publication Data

US 2006/0085946 A1 Apr. 27, 2006

(30) Foreign Application Priority Data

Oct. 21, 2004 (JP) ............... 2004-307347

(51) Int. Cl.
*B65H 5/00* (2006.01)

(52) U.S. Cl. ............ 271/10.01; 271/3.14; 271/10.09; 399/367; 399/380; 16/239

(58) Field of Classification Search .......... 16/239; 49/156, 240, 245, 381; 271/3.14–7, 10.01–10.16, 271/11–17; 399/367, 380
See application file for complete search history.

(56) References Cited

U.S. PATENT DOCUMENTS

| | | | | |
|---|---|---|---|---|
| 799,503 A | * | 9/1905 | Tripp | 16/239 |
| 1,045,875 A | * | 12/1912 | Nilsen | 16/239 |
| 2004/0093799 A1 | * | 5/2004 | Yoshikawa et al. | 49/192 |
| 2007/0084361 A1 | * | 4/2007 | Dumenil | 101/40.1 |

FOREIGN PATENT DOCUMENTS

| | | | |
|---|---|---|---|
| JP | 02153183 A | * | 6/1990 |
| JP | 10252740 | | 9/1998 |
| JP | 2000129993 | | 5/2000 |

* cited by examiner

*Primary Examiner*—Patrick Mackey
*Assistant Examiner*—Gerald W McClain
(74) *Attorney, Agent, or Firm*—Banner & Witcoff, Ltd.

(57) ABSTRACT

A hinge device is configured that when a cover is opened, a support-section-side pivot shaft is guided upward by a fixed-section-side guide groove; and a fixed-section-side pivot shaft is guided while being restricted in downward movement by a support-section-side guide groove which tilts in accordance with a pivot operation of the cover. As a result, occurrence of interference between a frontward edge of the cover and an upper face of a document ejection tray can be prevented without causing the frontward edge to move lower than its position in a face-down state. In addition, chattering of the cover during the opening/closing operations can also be prevented.

14 Claims, 12 Drawing Sheets

HINGE DEVICE, AUTOMATIC DOCUMENT FEEDER, SCANNING UNIT, AND IMAGE FORMING APPARATUS

BACKGROUND

1. Field

The present invention relates to a hinge device, as well as to an automatic document feeder having the hinge device, to a scanning unit having the same, and to an image forming apparatus having the same.

2. Related Art

In a multifunction machine having a printing function, a scanning function, and the like, a document platen is reclosable with respect to a main body; and the document platen and the main body are generally connected by means of a hinge. As an example of this configuration, JP-A-2000-129993 discloses a hinge device including an attachment member attached to a main body, and a movable member pivotally attached to the attachment member via a pair of hinges. More specifically, the hinge device has teeth disposed around the pair of hinges; and a pair of fixed racks which extend in the horizontal direction and which are to be engaged with the teeth. According to this configuration, when the movable member is pivoted clockwise, the pair of hinges move to the left. Accordingly, the distance between the hinges and a wall behind the multifunction machine increases, thereby enabling a housing 12 to be opened wide without causing the housing 12 to bump against the wall.

In the configuration disclosed in JP-A-2000-129993, a pivot center of a hinge device is generally formed at an inner side in relation to a back face of a multifunction machine. Therefore, in the configuration disclosed in JP-A-2000-129993, as illustrated in FIG. 3 of the same, a notch is formed in a back end of a document platen, thereby preventing the back end from interfering with an upper face of the main body at the time of opening/closing of the document platen. However, such a configuration involves a problem that the notch must be formed in the document platen; as well as a problem that a gap is created between the notch and the upper face of the main body, which is not preferable in view of external appearance.

SUMMARY

The present invention provides a hinge device that enhances in external appearance without forming a notch in a movable member; an automatic document feeder having the hinge device; a scanning unit having the same; and an image forming apparatus having the same.

A hinge device pivotably joining a main body of an equipment and one end of a movable member to enable the movable member to move between a face-down position and an upright position. The hinge device includes: a fixed section that is fixed on the main body of the equipment; a support section that supports the movable member; a support-section-side pivot shaft that is disposed in the support section and extends along a direction orthogonal to a movement-locus plane where the movable member passes; and a fixed-section-side pivot shaft that is disposed in the fixed section and extends along the orthogonal direction. The fixed section is provided with a fixed-section-side guide hole that engages with the support-section-side pivot shaft and guides the support-section-side pivot shaft in a direction departing from the main body as the movable member moves from the face-down position to the upright position. The support section is provided with a support-section-side guide hole that engages with the fixed-section-side pivot shaft at a position displaced toward one end of the movable member in relation to an engagement position between the support-section-side pivot shaft and the fixed-section-side guide hole, the support-section-side guide hole guiding the fixed-section-side pivot shaft to approach the support-section-side pivot shaft as the movable member moves from the face-down position to the upright position.

DETAILED DESCRIPTION OF THE EMBODIMENT

An embodiment will be described below with reference to the drawings.

Figure 1:
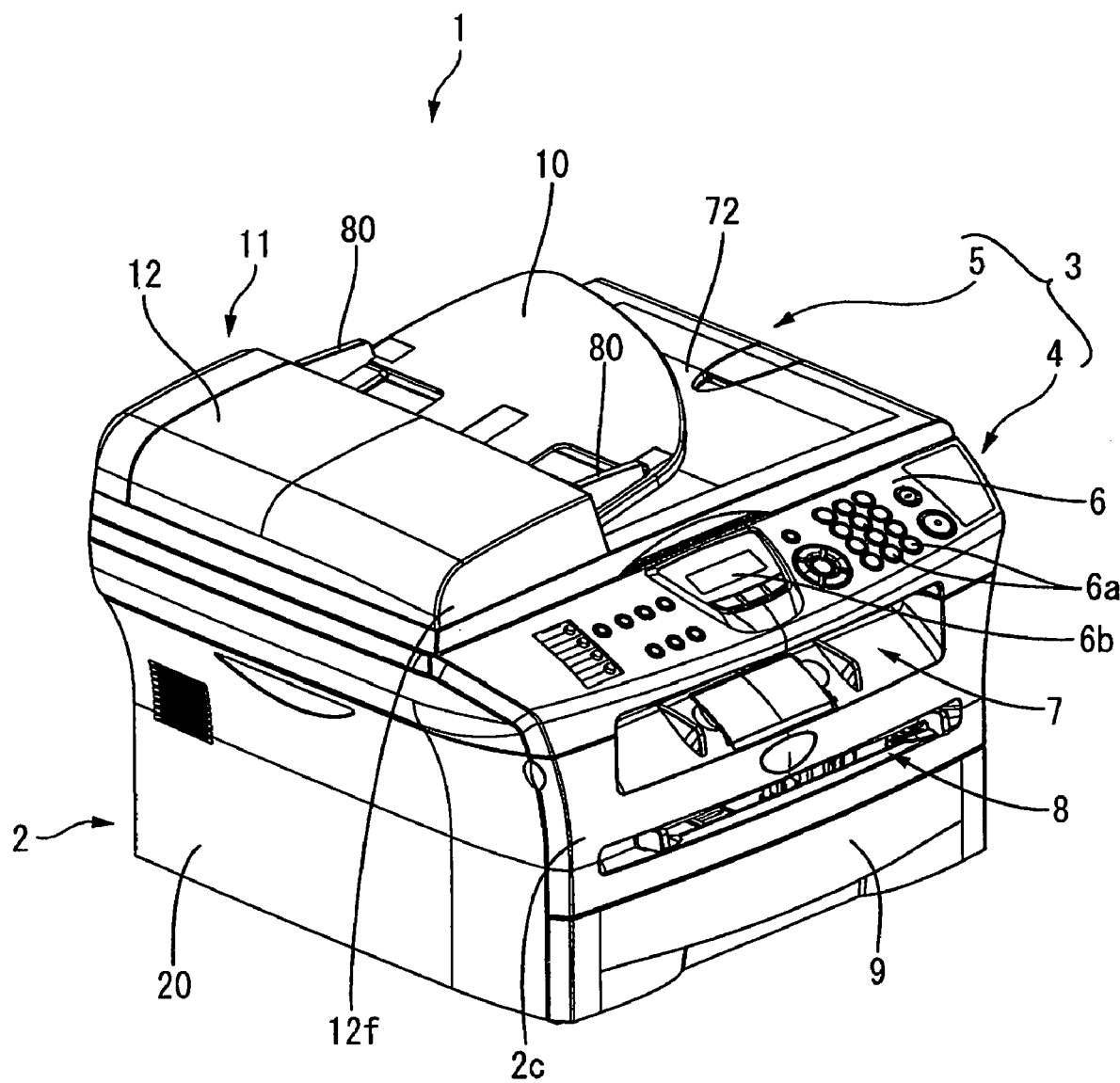
FIG. 1 is a perspective view illustrating the external appearance of a multifunction machine according to an embodiment.

An image forming apparatus according to the embodiment is a multifunction machine 1 having a printing function and a scanning function. FIG. 1 is a perspective view illustrating the external appearance of the image forming apparatus. The multifunction machine 1 has an image forming unit 2 which incorporates a feeder section 21 and an image forming section 22 (see FIG. 4); and an automatic document-scanning unit (hereinbelow, called a "scanning unit 3"). The multifunction machine 1 is configured such that a space is provided above a sheet ejection tray 2a—which is disposed on the upper face of the image forming unit 2—to thus accommodate the scanning unit 3. The scanning unit 3 includes a scanning section 70 (see FIG. 5) for scanning an image of a document M; an image scanner 4; and an automatic document feeder (hereinbelow called an "ADF 5"). The image scanner has the document table 4a (see FIG. 5), which is rectangular, on its upper face. The ADF is disposed so as to cover a document table 4a.

An operation panel 6, having various operation buttons 6a, a liquid crystal display section 6b, and the like, is disposed on one end (in the upper right direction in the plane of FIG. 1) of the image scanner 4. In addition, a sheet pickup hole 7 which openly communicates with the sheet ejection tray 2a is formed at a position below the operation panel 6. Thus, the image forming apparatus is configured as a so-called internally-ejected type. A slit-like, and horizontally-elongated manual sheet feeding port 8 is formed at a position below the sheet pickup hole 7. Further below the manual sheet feeding port 8, a sheet feeding cassette 9 is formed in such a manner as to be detachably removed from the same side as that where the operation panel 6, and the like, are disposed. In the following description, the direction toward the side where the operation panel 6 and the sheet feeding cassette 9 are disposed is referred to as forward (the direction to the lower right in the plane of FIG. 1); and the opposite direction (the direction to the upper left in the plane of FIG. 1) is referred to as backward.

Figure 2:
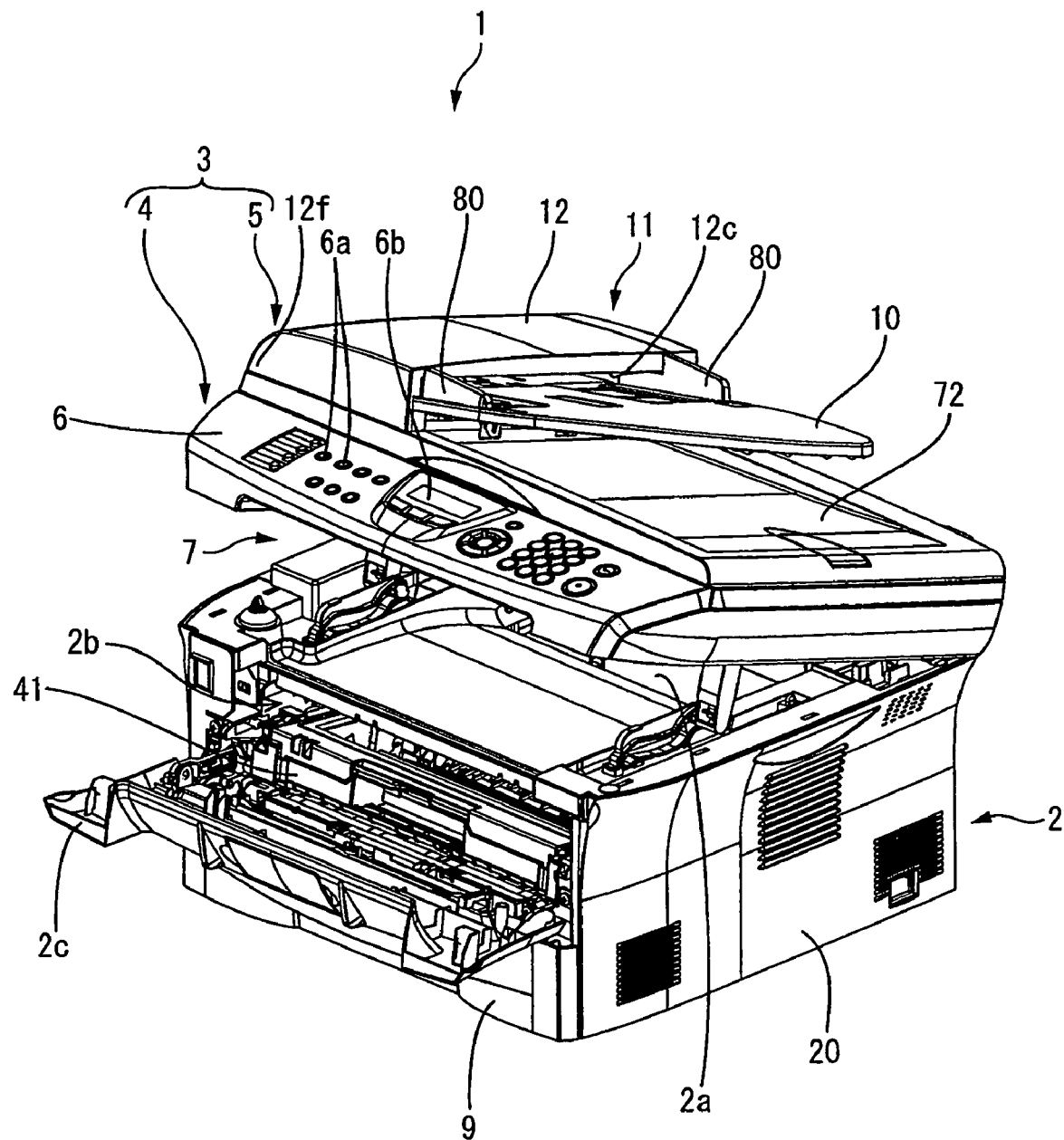
FIG. 2 is a perspective view of the multifunction machine in a state in which a scanning unit is open.

FIG. 2 is a perspective view of the multifunction machine 1 in a state in which the scanning unit 3 is open. As illustrated in the drawing, a back end—the end opposite the operation panel 6—of the scanning unit 3 is pivotably supported on a back end of the upper face of the image forming unit 2. According to this configuration, when the scanning unit 3 is lifted up, the sheet pickup hole 7 becomes further open, thereby facilitating pickup of a sheet W on which an image has been formed and which is discharged on the sheet ejection tray 2a.

Figure 3:
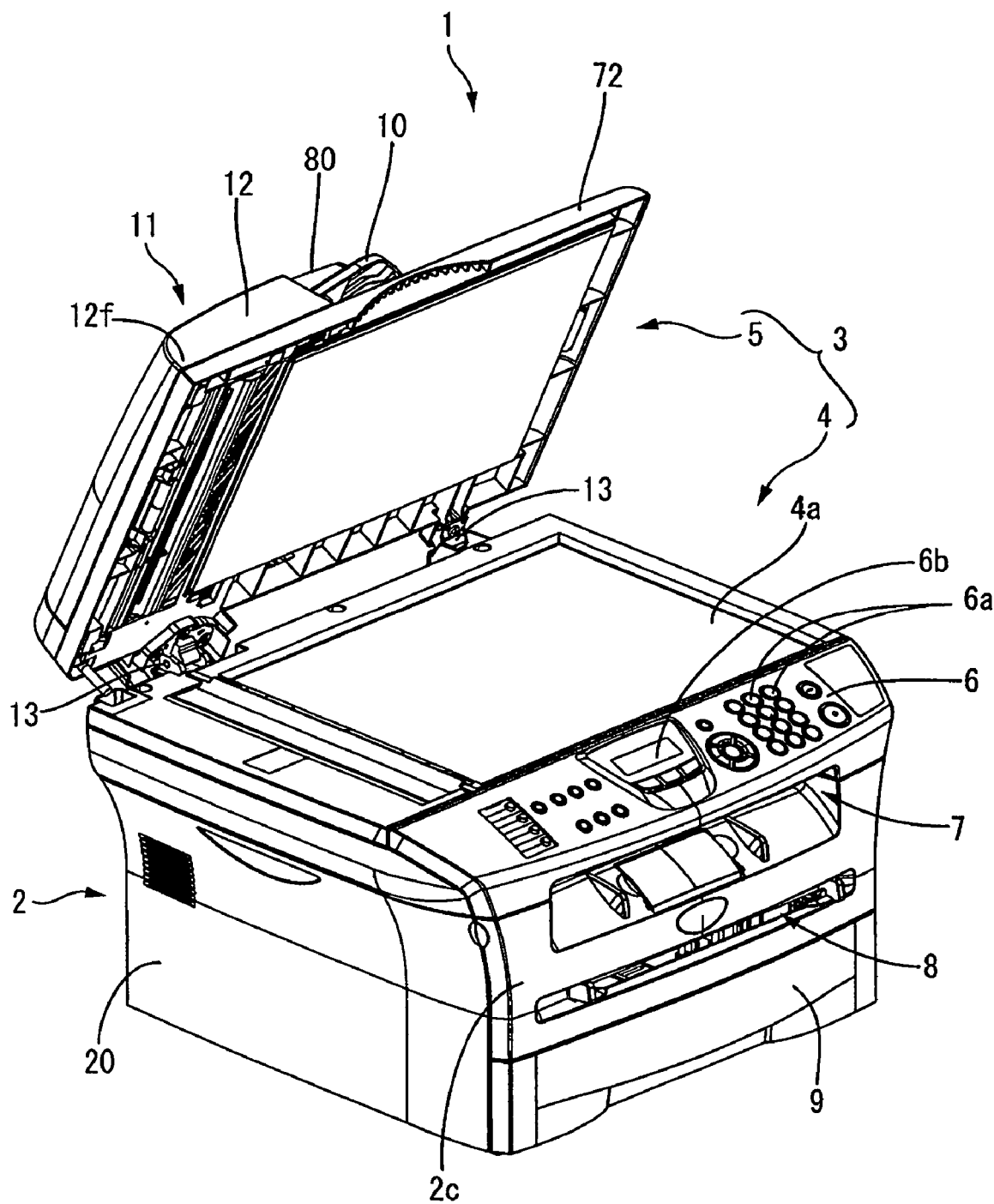
FIG. 3 is a perspective view of the multifunction machine in a state in which an ADF is open.

FIG. 3 is a perspective view of the multifunction machine 1 in a state in which the ADF 5 is open. As illustrated in the drawing, similarly, a back end—the end opposite the operation panel 6—of the ADF 5 is pivotably supported on a back end of the upper face of the image-scanning unit 4. Hence, when the ADF 5 is opened, the document table 4a on the upper face of the image scanner 4 is exposed. In addition, the ADF 5 includes a document tray 10 (corresponding to the "document placement section" in the invention) on an upper face of which the document M is to be placed; and a document transport unit 11 for transporting the document M placed on the document tray 10 along a transport direction (the direction toward the lower left in the plane of FIG. 1) which is parallel to a direction of a pivot shaft of the ADF 5.

A cover 12 for covering the document transport unit 11 is reclosably and pivotally supported in accordance with the configuration corresponding to the "hinge device" of the invention.

(1) Image Forming Unit

Figure 4:
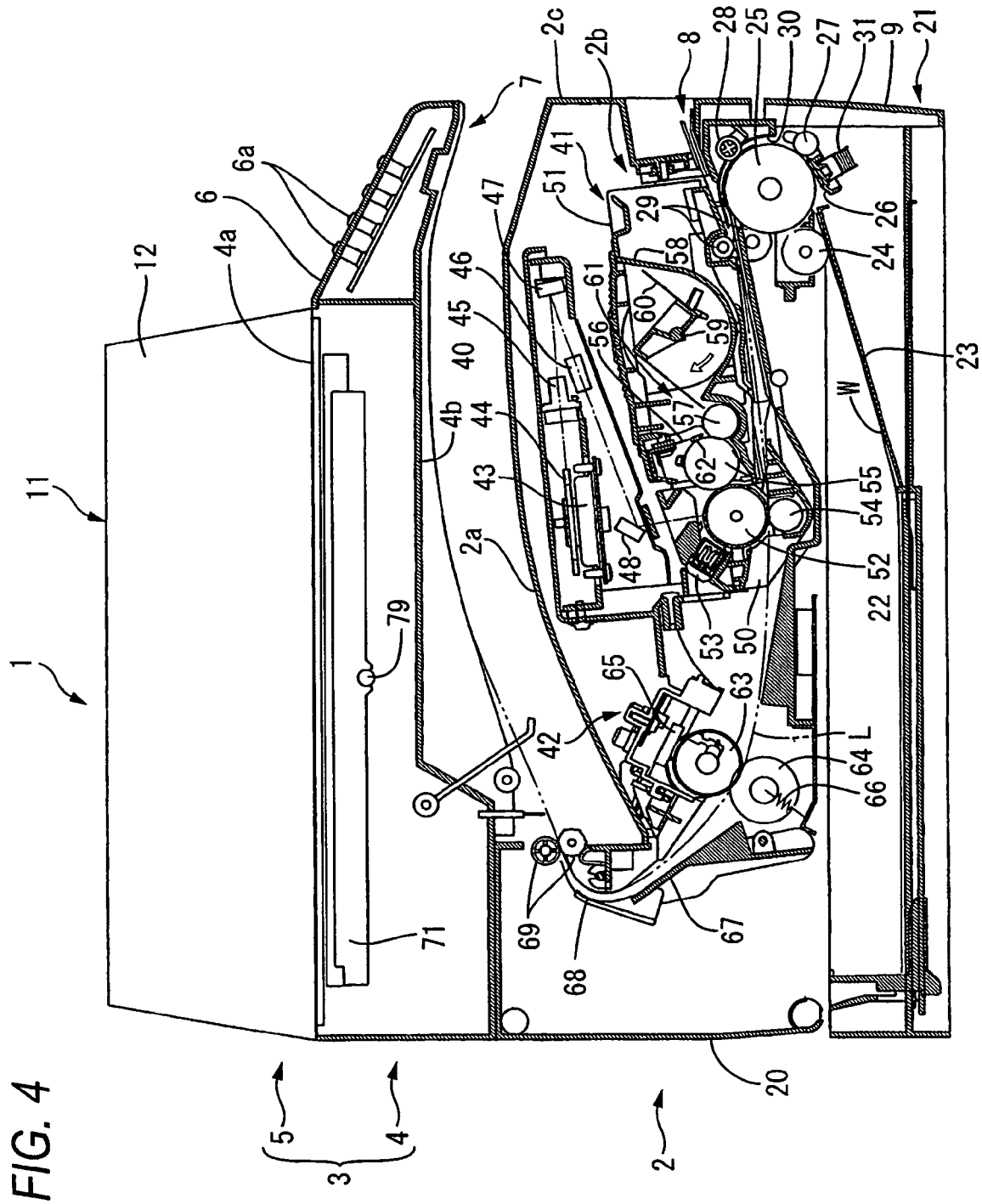
FIG. 4 is a side cross-sectional view of an essential portion of the multifunction machine.

The configurations of respective sections of the image forming unit 2 will be described by reference to FIG. 4. FIG. 4 is a side cross-sectional view of an essential portion of the multifunction machine 1 as viewed along an axial direction of a sheet feeding roller 25, and the like. The direction toward the right side in the plane of the drawing corresponds to forward of the multifunction machine 1; and the direction toward the left side in the same corresponds to the backward of the multifunction machine 1. Meanwhile, with regard to the document transport unit 11, a simplified side face thereof is illustrated.

The feeder section 21 for feeding the sheet W, and the image forming apparatus 22 for forming a predetermined image on the thus-fed sheet W are disposed within a casing 20 of the image forming unit 2. The sheet ejection tray 2a for retaining the thus-ejected sheet W, on which an image has been formed by the image forming section 22, is disposed on the upper portion of the image forming section 22.

(a) Feeder Section

The feeder section 21 includes a sheet feeding cassette 9; a sheet-pressing plate 23 disposed inside the sheet feeding cassette 9; a delivery roller 24 disposed above a lateral front edge of the sheet feeding cassette 9; the sheet feeding roller 25 and a separation pad 26; an opposing roller 27 opposing the sheet roller 25; a sheet dust removal roller 28; and a registration roller 29 disposed downstream in the transport direction of the sheet W in relation to the sheet dust removal roller 28.

A guide section 30 having an arc-like geometry along the delivery roller 24, the sheet feeding roller 25, the opposing roller 27, and the sheet feeding roller 25 turns the direction of the sheet W—which is supplied from the forward end of the sheet feeding cassette 9—so as to proceed backward of the multifunction machine 1, to thus deliver the same to the image forming section 22 disposed above the sheet feeding cassette 9.

The sheet feeding cassette 9, which is detachably mounted on the bottom of the casing 20, is employed for housing the sheet W in a stack. The sheet feeding cassette 9 is configured such that the sheet feeding cassette 9 can be pulled out forward of the multifunction machine 1 when the sheet W is to be supplied inside, or at other times. Upon removal of the sheet feeding cassette, the feeder section 21 is separated at a portion between the sheet feeding roller 25 and the separation pad 26, whereby the opposing roller 27, the separation pad 26, and a spring 31 disposed on the back side of the separation pad 26 are pulled out integrally with the sheet feeding cassette 9.

The sheet pressing plate 23 is swayably supported on an end (a back end), which is the side far from the sheet feeding roller 25. According to this configuration, the other end (a forward end), which is the side closer to the sheet feeding roller 25, of the sheet pressing plate 23 can move in the vertical direction, and is urged upward by an unillustrated spring. Accordingly, as the amount of stacked sheet W increases, the sheet pressing plate 23 is swayed downward against the tension force of the spring 31 about the end—serving as a pivot—which is the end far from the sheet pressing plate 23.

The delivery roller 24 is set so as to be brought into contact with the sheet W stacked on an uppermost layer in the sheet feeding cassette 9 by means of the sheet pressing plate 23, to thus transport the sheet W to apposition (a position between the sheet feeding roller 25 and the separation pad 26) where the sheet W can be transported by the sheet feeding roller 25.

The separation pad 26 is disposed at a position opposing the sheet feeding roller 25. The separation pad 26 is pressed against the sheet feeding roller 25 by the spring 31 disposed on the back side of the separation pad 26. In addition, the separation pad 26 has a function of preventing a plurality of sheets of the sheet W from being supplied to the transport path (a dashed line L in FIG. 4) in a stacked state. More specifically, the sheet W having hitherto been delivered by the delivery roller 24 contacts with the sheet feeding roller 25 and the separation pad 26. At this time, an appropriate frictional force is exerted between the separation pad 26 and the sheet W. Therefore, even when a plurality of sheets of the sheet W are delivered to the separation pad 26 by the delivery roller 24, the sheet W other than a sheet positioned at the uppermost layer is retained by the separation pad 26. Accordingly, a single sheet of the sheet W is supplied at a time from the sheet feeding roller 25.

Subsequently, the sheet W is subjected to sheet dust removal by the sheet dust removal roller 28 while being turned in direction by the sheet feeding roller 25 about 180°, and thereafter delivered to the registration roller 29.

The registration roller 29, which includes a pair of rollers, is controlled by a control device (not shown) for activation and stopping operations in accordance with a detection timing detected by a position sensor (not shown) disposed in the vicinity of the sheet feeding roller 25. Hence, a skew of the sheet W is corrected through this control. More specifically, during the course of transportation of the sheet W by the sheet feeding roller 25, the control device causes the registration roller 29 to activate; and, when the position sensor detects a leading edge of the sheet W, the control device causes the registration roller 29 to stop. Subsequently, when the sheet W contacts with the registration roller 29 and reaches a state in which the sheet W is considered about to sag, the control device activates the registration roller 29 again, to thus deliver the sheet W to the image forming section 22.

The manual sheet feeding port 8—for feeding the sheet W to a position of the registration roller 29 from the front of the multifunction machine 1—is formed substantially above the sheet feeding roller 25. The manual sheet feeding port 8 enables the sheet W to be supplied to the transport path L without storing the sheet W in the sheet feeding cassette 9.

(b) Image Forming Section

The image forming section 22 includes a scanner unit 40, a processing unit 41, and a fusing unit 42.

Scanner Unit

The scanner unit 40 is disposed at an upper portion in the casing 20, and has a laser beam emitting section (omitted from the drawing), a polygon mirror 44 which is rotated by a polygon motor 43, lenses 45 and 46, reflection mirrors 47 and 48, and the like. The laser beam emitting section emits a laser beam in accordance with given image data. The laser beam passes through or is reflected by the polygon mirror 44, the lens 45, the reflection mirror 47, the lens 46, and the reflection mirror 48, in this order, as indicated by a dashed line in FIG. 1 so as to irradiate, in a high-velocity scanning operation, the surface of a photosensitive drum 52 of the processing unit 41, which will be described later.

Processing Unit

As illustrated in FIG. 4, the multifunction machine 1 includes the processing unit 41 which includes at least the photosensitive drum 52 and which is detachable in relation to a main body section of the image forming unit 2. A housing section 2b for housing, below the sheet ejection tray 2a, the processing unit 41 is formed in the image forming unit 2 in such a manner that the housing section 2b is open toward the front side of the casing 20. As illustrated in FIG. 2, an attachment/detachment operation of the processing unit 41 can be performed by means of opening a reclosable door 2c which is disposed so as to seal the opening in a reclosable manner.

The processing unit 41 includes a drum cartridge 50 and a development cartridge 51. A space is provided between the processing unit 41 and the scanner unit 40.

The drum cartridge 50 of the processing unit 41 includes the photosensitive drum 52, a scorotron electrification device 53, and a transfer roller 54. Meanwhile, the development cartridge 51 includes a developing roller 55, a layer-thickness regulation blade 56, a toner supply roller 57, a toner box 58, and the like. The development cartridge 51 is detachably mounted on the drum cartridge 50.

Toner (a developing agent) is filled in the toner box 58. The toner in the toner box 58 is stirred by rotation of an agitator 60, which is supported by a rotary shaft 59 disposed at the center of the toner box 58, in the direction (clockwise) indicated by an outlined arrow, to thus be discharged from a toner supply port 61 formed in the toner box 58.

The toner supply roller 57 is disposed at a lateral position in relation to the toner supply port 61 so as to be rotatable counterclockwise. In addition, the developing roller 55 is disposed so as to be rotatable counterclockwise and to oppose the toner supply roller 57. The toner supply roller 57 and the developing roller 55 are in contact with each other so as to compress each other to a certain extent.

The toner supply roller 57 is formed by means of covering a metal roller shaft with a roller formed from a conductive, foamed material. The developing roller 55 is formed by means of covering a metal roller shaft with a roller formed from a conductive, rubber material having no magnetic properties. More specifically, a roller section of the developing roller 55 is formed such that the surface of a roller main body formed from a conductive urethane rubber or silicone rubber containing carbon fine particles, or the like, is covered with a coating layer of a fluorine-containing urethane rubber or a fluorine-containing silicone rubber. Meanwhile, a developing bias is applied to the developing roller 55.

The layer-thickness regulation blade 56 is disposed in the vicinity of the developing roller 55. The layer-thickness regulation blade 56 is formed such that a pressing section 62, which has a semicircular profile and which is formed from an insulating silicone rubber, is provided at a tip end of a blade main body formed from a metallic plate spring member. The layer-thickness regulation blade 56 is supported on the developing cartridge 51 at a position in the vicinity of the developing roller 55, and is configured so that the pressing section 62 is brought into press-contact with the developing roller 55 by an elastic restoration force of the blade main body.

The toner discharged from the toner supply port 61 is supplied to the developing roller 55 by rotation of the toner supply roller 57. At this time, the toner becomes positively electrified by means of friction between the toner supply roller 57 and the developing roller 55. Subsequently, in accordance with rotation of the developing roller 55, the toner supplied onto the developing roller 55 enters between the pressing section 62 and the developing roller 55, to thus be further frictionally electrified sufficiently, and formed on the developing roller 55 as a thin layer of uniform thickness.

The photosensitive drum 52 is disposed so as to be rotatable clockwise and to oppose the developing roller 55 at a lateral position in relation to the developing roller 55. The photosensitive drum 52 has a drum main body which is grounded; and a surface section formed from a photosensitive layer which is made from a polycarbonate, or the like, and which is for positive electrification. Meanwhile, the photosensitive drum 52 is configured so as to be rotated by motive power supplied from an unillustrated main motor.

The scorotron electrification device 53 is disposed with a predetermined clearance from the photosensitive drum 52 so as not to come into contact therewith. The scorotron electrification device 53 is disposed, in a radial direction of the photosensitive drum 52, about 30° upward from the horizontal direction. In addition, the scorotron electrification device 53 is a scorotron electrification device for positive electrification which causes an electrifying wire of tungsten, or the like, to generate corona discharge. The scorotron electrification device is configured to positively and uniformly electrify the surface of the photosensitive drum 52.

The surface of the photosensitive drum 52 is positively, uniformly electrified by the scorotron electrification device 53 in accordance with rotation of the photosensitive drum 52. Thereafter, the surface is subjected to exposure to high-velocity scanning by the laser beam emitted from the scanner unit 40. As a result, an electrostatic latent image is formed in accordance with given image data.

Next, when the toner—formed on the developing roller 55 and positively electrified—opposes the photosensitive drum 52 and is brought into contact therewith by rotation of the developing roller 55, the toner is supplied to the electrostatic latent image formed on the surface of the photosensitive drum 52; that is, to areas whose electric potential has been lowered upon exposure to the laser beam. Thus, the toner is selectively carried, thereby rendering the toner image visible. As a result, reversal development is attained.

The transfer roller 54 is disposed below the photosensitive drum 52 so as to oppose the photosensitive drum 52, and supported on the drum cartridge 50 so as to be rotatable counterclockwise. The transfer roller 54 is formed by means of covering a metal roller shaft with a roller formed from an ion-conductive rubber material, and configured so that a transfer bias (a transfer forward bias) is applied thereon during a transfer process. Accordingly, the visible image formed on the surface of the photosensitive drum 52 is transferred onto the sheet W during the course of the sheet W passing between the photosensitive drum 52 and the transfer roller 54.

Fusing Unit

The fusing unit 42 is disposed downstream (rearward) of the processing unit 41 in the sheet transport direction, and has a fixing roller 63 on which a gear is formed, a pressing roller 64 for pressing the fixing roller 63, and a thermostat 65.

The fixing roller 63 is made from metal, and has a halogen lamp for heating. The pressing roller 64 has a spring 66 for rotatably pressing (urging) the pressing roller 64 from below in a direction toward a center shaft of the fixing roller 63. In addition, the pressing roller 64 is configured so as to come into close contact with the fixing roller 63 or the sheet W, to thus rotate in synchronization with the fixing roller 63.

The thermostat 65, which is formed from, e.g., a bimetal, switches on and off the power of the heater for heating the fixing roller 63 in accordance with an amount of heat generated from the fixing roller 63, thereby preventing the fixing roller 63 from being heated to an abnormally high temperature.

In the fusing unit 42 configured as above, the fixing roller 63 heats and presses the toner transferred onto the sheet W in the processing unit 41 during the course of the sheet W passing between the fixing roller 63 and the pressing roller 64, thereby fixing the toner. Furthermore, the fixing roller 63 transports the sheet W on which an image has been fixed to a discharge roller 69 by way of a sheet ejection path formed from guide members 67 and 68. Subsequently, the discharge roller 69 discharges the thus-transported sheet W onto the sheet ejection tray 2a. More specifically, the sheet W on which an image has been formed in the image forming section 22 is turned in direction so as to travel forward, by the fusing unit 42, the guide members 67 and 68, and the discharge roller 69, and is ejected to the sheet ejection tray 2a disposed above the image forming section 22.

(2) Scanning Unit

The scanning unit 3 has the image scanner 4 and the ADF 5. The image scanner 4 is disposed above the sheet ejection tray 2a such that its lower face 4b opposes the sheet ejection tray 2a, so as to cover the sheet ejection tray 2a.

The scanning unit 3 is configured as a flat-bed-type scanner. As described previously, this flat-bed-type scanner is configured such that the document table 4a in the scanning section 70 is exposed when the ADF 5 is opened backward (see FIG. 3), thereby enabling performance of a scanning operation in a state in which a book, or any of various other types of documents, is placed on the document table 4a.

Figure 5:
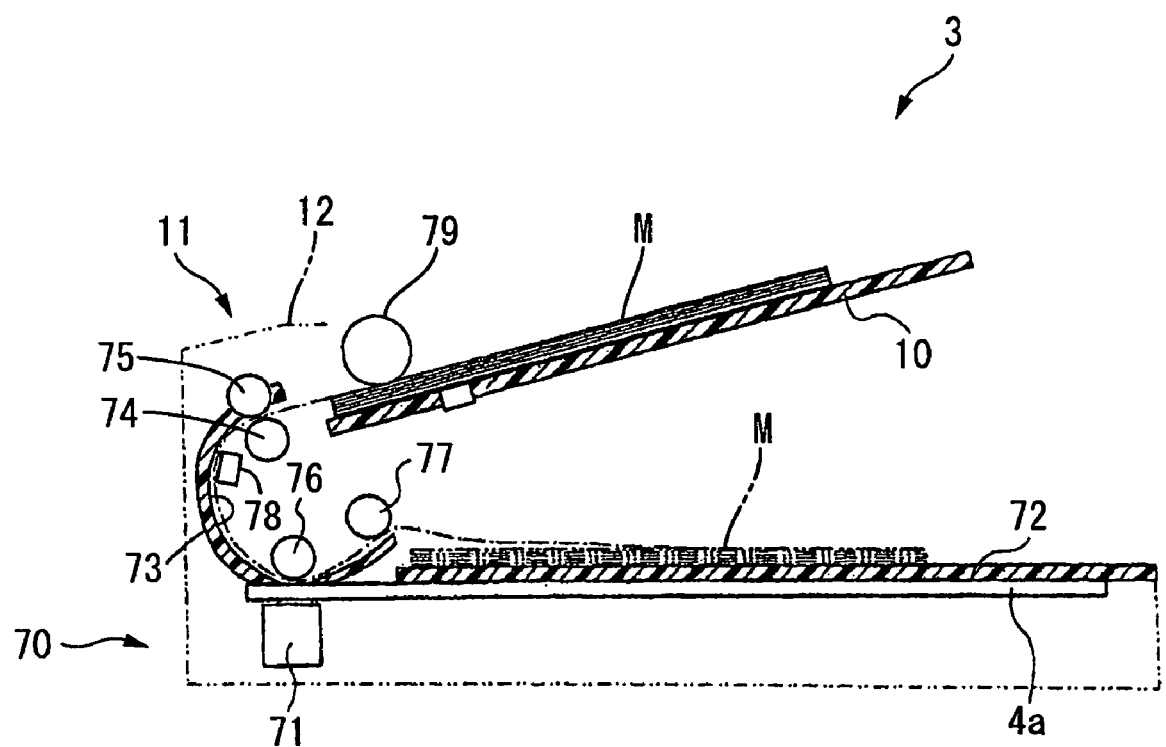
FIG. 5 is a simplified view illustrating an internal configuration of a scanning section.

Meanwhile, FIG. 5 schematically illustrates an internal configuration of the scanning section 70. As illustrated in the drawing, the scanning section 70 has a transport path 73 for guiding the document M. The transport path 73 is configured so as to have an arc shape; and to cause the document M placed on the document tray 10 to oppose a CIS (contact image sensor) 71 with the document table 4a made from a glass plate therebetween, and to be further guided to a document ejection tray (main body) 72. A document feed roller 79 for separating one sheet at a time of the document M placed on the document tray 10, thereby guiding the sheet to the transport path 73, is disposed at an upstream tip end of the transport path 73 in the document transport direction. In addition, a transport roller 74 and a pinch roller 75 are disposed downstream of the document feed roller 79. The transport roller 74 is disposed so as to come into contact with a lower face of the document M. The pinch roller 75 is disposed on the side close to the lower face of the cover 12, and configured so that the pinch roller 75 presses the transport roller 74 from above in a state in which the cover 12 is closed (in a face-down position).

In addition, at a portion which is on the transport path 73 and which opposes the CIS 71, there is provided a pressing roller 76 for pressing the document m passing through the portion, thereby bringing the document M into close contact onto the document table 4a. A discharge roller 77 for discharging the document M onto the document ejection tray 72 is disposed at a downstream tip end of the transport path 73 in the document transport direction. Furthermore, a passage detection sensor 78 for detecting whether or not the document M has passed is disposed at a point on the transport path 73, in the vicinity of the transport roller 74 and the pinch roller 75.

The CIS 71 is a line-shaped sensor extending in a direction (the lateral direction in the plane of FIG. 1; the depth direction in the plane of FIG. 5) orthogonal to the transport direction of the document M. A plurality of photodiodes (omitted from the drawing) are disposed in a row in the longitudinal direction of the CIS 71. The CIS 71 is configured so as to receive light reflected by the document M obtained when strong light is radiated from an unillustrated light source with the respective photodiodes, and convert a light intensity (brightness) of each pixel of the document M into an electrical signal. The scanning section 70 converts the signal into digital data by means of an unillustrated A/D converter, thereby enabling scanning of an image formed on the document M as image data.

The scanning section 70 performs scanning operation pertaining to the document M, in some cases, by means of placing the document M on the document table 4a and, in other cases, by utilizing the ADF 5. In the former case, the CIS 71 is moved along a shaft 79 extending along the transport direction (the depth direction in the plane of FIG. 1) of the document M as well as along the document table 4a. During this moving operation, the scanning operation pertaining to the document M placed on the document table 4a is performed one line at a time. In the latter case, the CIS 71 is moved to a left end of the document tray 10 so as to oppose the pressing roller 76 with the document table 4a therebetween, and retained at the point, where the CIS 71 performs the scanning operation pertaining to the document M transported by the ADF 5 one line at a time.

(3) ADF

Figure 6:
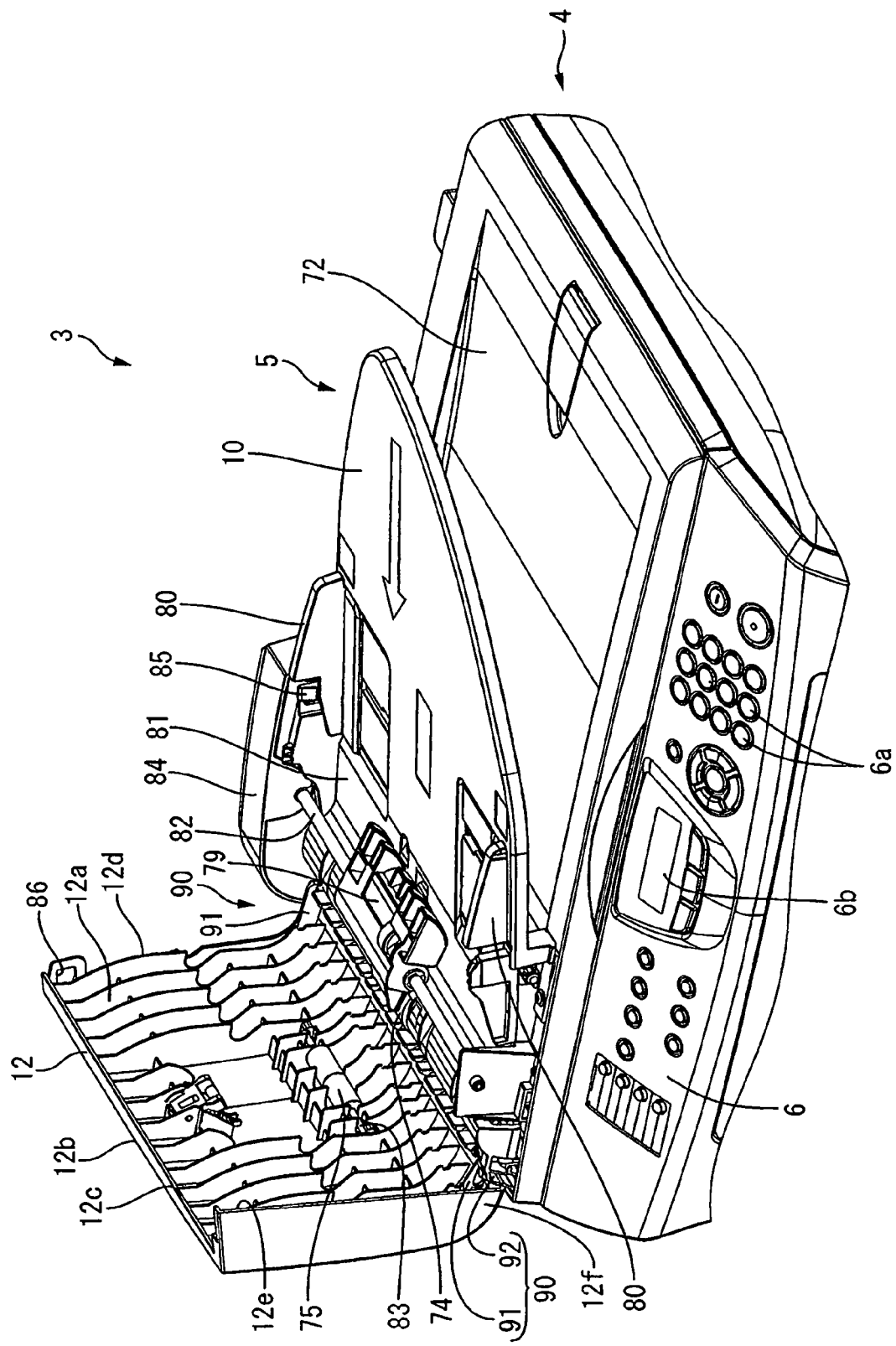
FIG. 6 is a perspective view illustrating an ADF section.

Next, the ADF 5 will be described specifically. FIG. 6 is a perspective view of the ADF 5 as viewed from an upward oblique direction. In descriptions in relation to the ADF 5, the transport direction (the lateral direction in the plane of FIG. 6; the lateral direction of the multifunction machine 1) of the document M placed on the document tray 10 is referred to as the "document transport direction." Frontward (leftward in the plane of FIG. 6; the direction indicated by an outlined arrow in the drawing) in the document transport direction is referred to as "frontward"; and rearward (rightward in the plane of FIG. 6) in the same is referred to as "rearward." In addition, FIG. 6 illustrates a state in which the cover 12 is open; that is, the cover 12 stands in an upright position in relation to the document ejection tray 72 serving as a main body of the ADF 5. Hereinbelow, the state illustrated in FIG. 6 is referred to as an "upright position" or an "open condition"; in contrast, the state in which the cover 12 is closed as illustrated in FIGS. 1 to 4 is referred to as a "face-down position" or a "closed condition."

Document Tray and Document Transport Unit

The above-mentioned document table 4a has the geometry of a rectangle extending in the document transport direction. The document ejection tray 72, which covers a front face of the document table 4a, is formed into a flat-plate shape corresponding to the rectangle. The document transport unit 11 covered by the cover 12 is disposed on the document ejection tray 72 on a side including a frontward edge 12f. The document tray 10 is disposed in a tilt position extending upward and obliquely rearward with respect to the document transport unit 11 from a rearward position, as well as in a state of having a clearance from the document ejection tray 72. Meanwhile, on the document tray 10, there is disposed a pair of guide walls 80, 80 for pinching the document M placed on the document tray 10 at lateral ends in the widthwise direction (the direction orthogonal to the document transport direction; the front-rear direction of the multifunction machine 1), thereby guiding the transport operation.

The document transport unit 11 has a document chute section 81 for connecting the frontward edge 12f of the document tray 10 and the transport path 73. The document feed roller 79, which is rotated by a rotary shaft 82 extending in the direction orthogonal to the document transport direction, is disposed on the document chute section 81 at a position close to the document tray 10. The document feed roller 79 pivots in a state of being in contact with the surface of the uppermost document M placed on the document tray 10, thereby guiding the document M to the transport path 73.

In addition, the transport roller 74 is disposed at a point on the transport path 73 on the side continuous with the document chute section 81 so as to be rotatable on a rotary shaft (not shown) parallel with the rotary shaft 82. Meanwhile, the pinch roller 75 is disposed on an inner face 12a of the cover 12 at a position opposing the transport roller 74 so as to be rotatable on a rotary shaft 83 parallel with the rotary shaft 82. The pinch roller 75 is configured so as to be pressed by the transport roller 74 in a state in which the cover 12 is closed (in the face-down position) (see FIG. 5). When the transport roller 74 is rotated, the pinch roller 75 is driven by the rotation, thereby playing the role of nipping the document M supplied from the document feed roller 79 between the rollers 74 and 75, to thus guide the same downstream along the transport path 73. Meanwhile, the rotary shaft 82 of the document feed roller 79 and a rotary shaft of the transport roller 74 are configured to receive drive power from an unillustrated motor by way of a gear mechanism (covered by a case 84 in FIG. 6) disposed at the back of the document chute section 81.

Cover

The cover 12 is pivotably joined at the frontward edge 12f of the document ejection tray 72 by way of a hinge section 90 which corresponds to the "hinge device" of the present invention. The cover 12 has the geometry of a rectangular box whose lower portion is open in its entirety. An upper face 12b of the cover 12 has a geometry which covers the document chute section 81 from above, and a frontward portion of the upper face 12b is curved along the transport path 73. A rectangular notch 12c is formed in a rearward wall which is adjacent to the document tray 10 in such a manner as to avoid the frontward edge 12f of the document tray 10, and the transport path L of the document M placed on the tray 10.

In addition, a notch 12d corresponding to the shape of the case 84—for covering the gear mechanism—is formed in a frontward-right wall (a wall on the back face of the multifunction machine 1). In addition, at a portion rearward from the notch 12d, there is provided an engagement-counterpart section (an engagement recess 86) to be engaged with a hook section (an engagement projection 85)—which is disposed on a side of the document chute 81—in the state in which the cover 12 is closed. According to this configuration, rising of the rearward portion of the cover 12, which may otherwise occur when the cover 12 is closed, can be prevented.

Meanwhile, a frontward-left wall of the cover 12 (a wall on the front face of the multifunction machine 1) has a lower end face 12e (corresponding to the "opposing face of the main body" of the present invention) which is formed into a straight-line-like flat surface in its overall length so as to face the upper face 72a (corresponding to the "opposing section" in the present invention) of the document ejection tray 72 without clearance therebetween in the state in which the cover 12 is closed, as also illustrated in FIGS. 1 to 3.

Hinge Section

Figure 7:
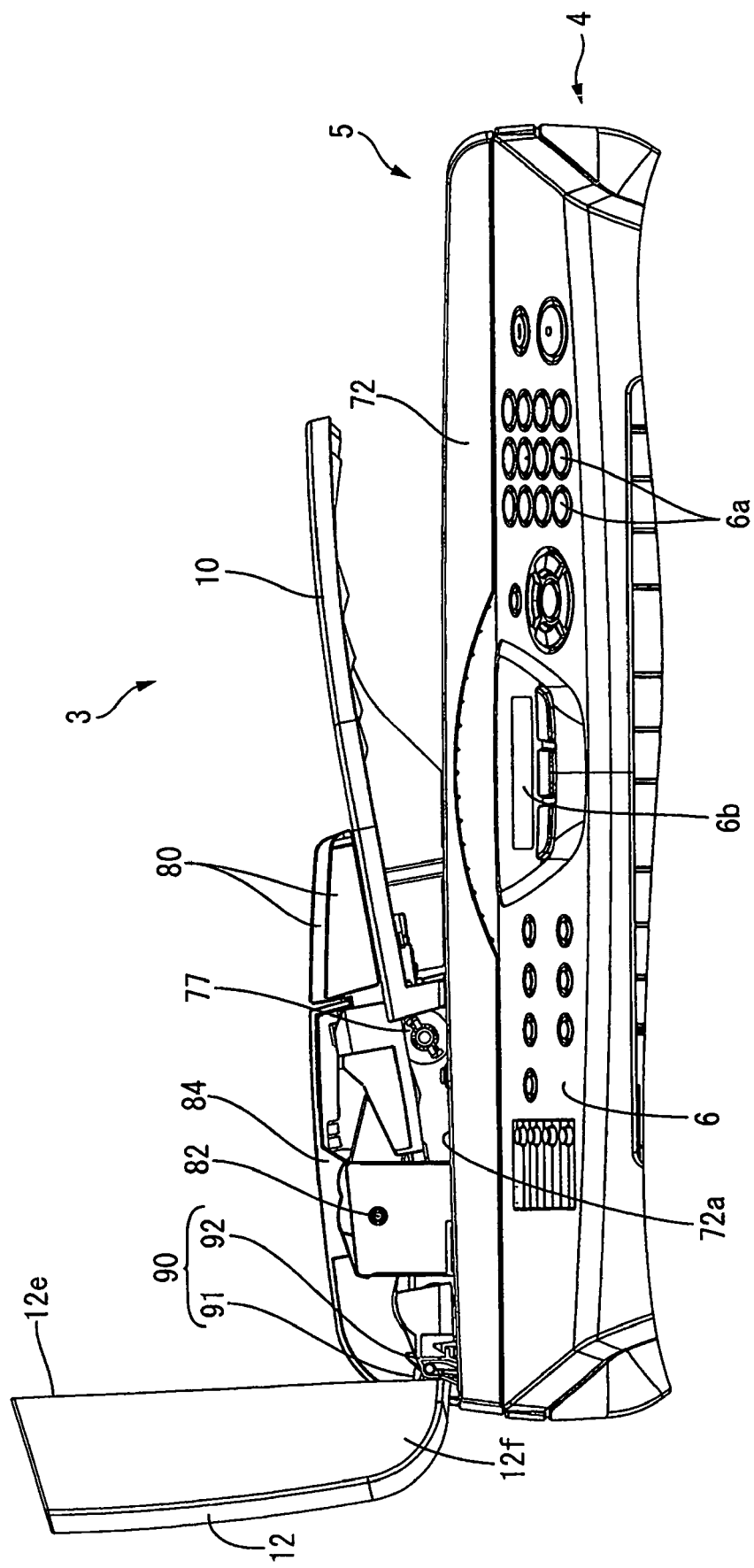
FIG. 7 is a front view of the ADF in a state in which a cover is open.
Figure 8:
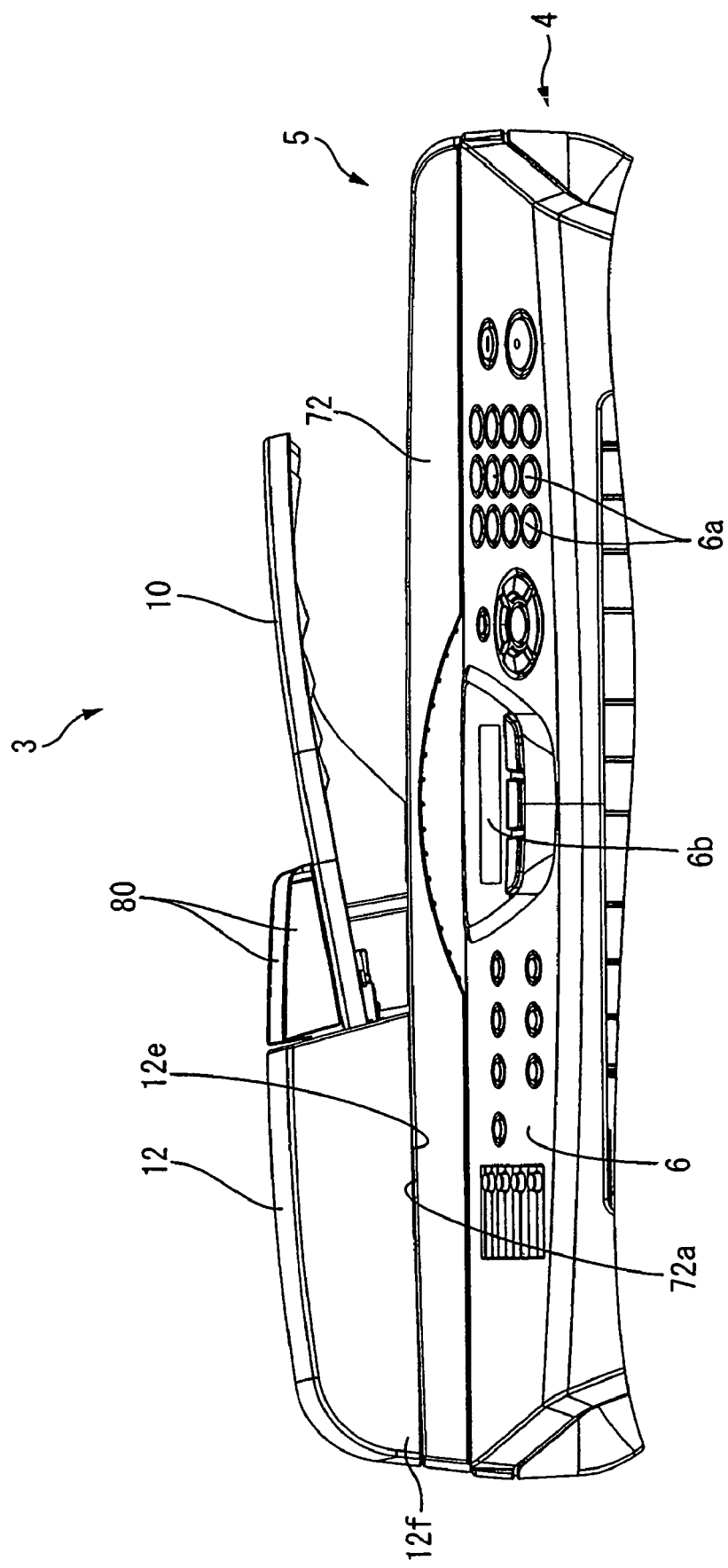
FIG. 8 is a front view of the ADF in a state in which the cover is closed.
Figure 9:
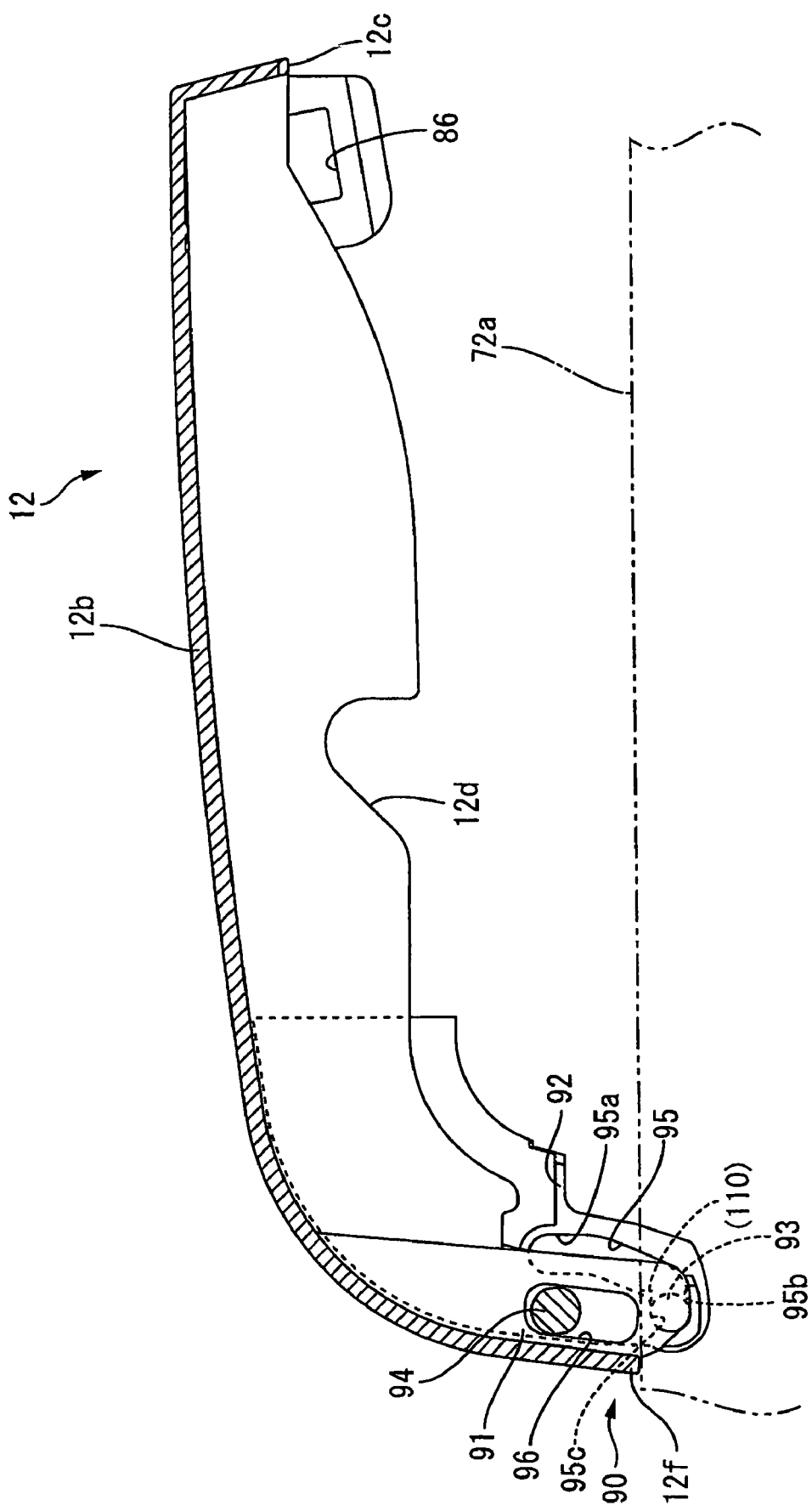
FIG. 9 is a schematic view illustrating the cover in a face-down position.

Next, the configuration of the hinge section 90 will be described by reference to FIGS. 7 to 9 in addition to FIG. 6. FIG. 7 is a front view of the ADF in a state in which the cover is open. FIG. 8 is a front view of the ADF in a state in which the cover is closed. FIG. 9 is a schematic view illustrating the cover in the face-down position.

The hinge section 90 according to the present embodiment is an element for joining the cover 12 and the document ejection tray 72 pivotably between the face-down state (see FIG. 7) and the upright position (see FIG. 8) about the frontward edge 12f.

As illustrated in FIGS. 6 and 7, a pair of flat-plate-like support sections 91, 91 are integrally projected on opposite ends—in the direction orthogonal to the document transport direction—of the curved frontward edge 12f of the cover 12. Meanwhile, a pair of fixed sections 92, 92 (FIGS. 6 and 7 illustrate only the fixed section 92 on the frontward-left side ) are disposed on the document chute section 81 side of the cover 12 so that each of the fixed sections 92 contacts with an outer face (a back face; a face opposite a face where the pair of support sections 91 oppose each other) of the respective support section 91. Hereinbelow, since, with regard to the support sections 91 and the fixed sections 92, frontward-left elements and frontward-right elements are substantially analogous in configuration, the support section 91 and the fixed section 92 on the frontward-right side will be described as the example.

As enlargedly illustrated in FIG. 9, the support section 91 is integrally formed so as to, in a state in which the cover 12 is in the face-down position, partially project toward the document ejection tray 72 below. Meanwhile, the fixed section 92 has a geometry in which a lower portion of the fixed section 92 is located below the upper face of the document ejection tray 72, and an upper portion of the fixed section 92 projects upward. A support-section-side pivot shaft 93 having a circular cross section is formed integrally on a lower end portion of the support section 91—the lower end is positioned lowermost when the cover 12 is in the face-down position—, wherein the support-section-side pivot shaft 93 projects in a direction facing the fixed section 92 (a direction which is away from the scanner in the plane of FIG. 9 and orthogonal to the document transport direction, and the direction corresponds to the "direction orthogonal to the movement-locus plane" of the present invention). A fixed-section-side pivot shaft 94 having a circular cross section and projecting in a direction (toward the viewer in the plane of FIG. 9) toward the support section 91 is integrally formed at a position, which is located above the support-section-side pivot shaft 93 when the cover 12 is in the face-down position, of the fixed section 92.

A fixed-section-side guide groove 95, whose width is slightly larger than a diameter of the support-section-side pivot shaft 93 and which is to be engaged with the support-section-side pivot shaft 93, is formed in the fixed section 92. The fixed-section-side guide groove 95 is formed such that an uppermost end portion 95a is located at a rearward position (on an open-end side of the cover 12) with respect to the fixed-section-side pivot shaft 94; and formed into an arc shape in which the fixed-section-side guide groove 95 extends downward from the uppermost end portion 95a and laps around at a halfway location so as to reach a position immediately below the fixed-section-side pivot shaft 94. Furthermore, the fixed-section-side guide groove 95 has such a geometry that a lowermost end portion 95b where, in the face-down state, the support-section-side pivot shaft 93 is bent along the horizontal direction (the document transport direction; a direction along the cover 12 in the face-down position). More specifically, an upper face 95c of the lowermost end portion 95b is parallel with the horizontal direction.

Meanwhile, a support-section-side guide groove 96, whose width is slightly larger than a diameter of the fixed-section-side pivot shaft 94 and which is to be engaged with the fixed-section-side pivot shaft 94, is formed in the support section 91. The support-section-side guide groove 96 has a geometry of, in the face-down state, a straight line which extends downward (to the projection end of the support section 91; a direction orthogonal to the upper face 12b of the cover 12) from an engagement position with the fixed-section-side pivot shaft 94 above the support-section-side pivot shaft 93.

Figure 12:
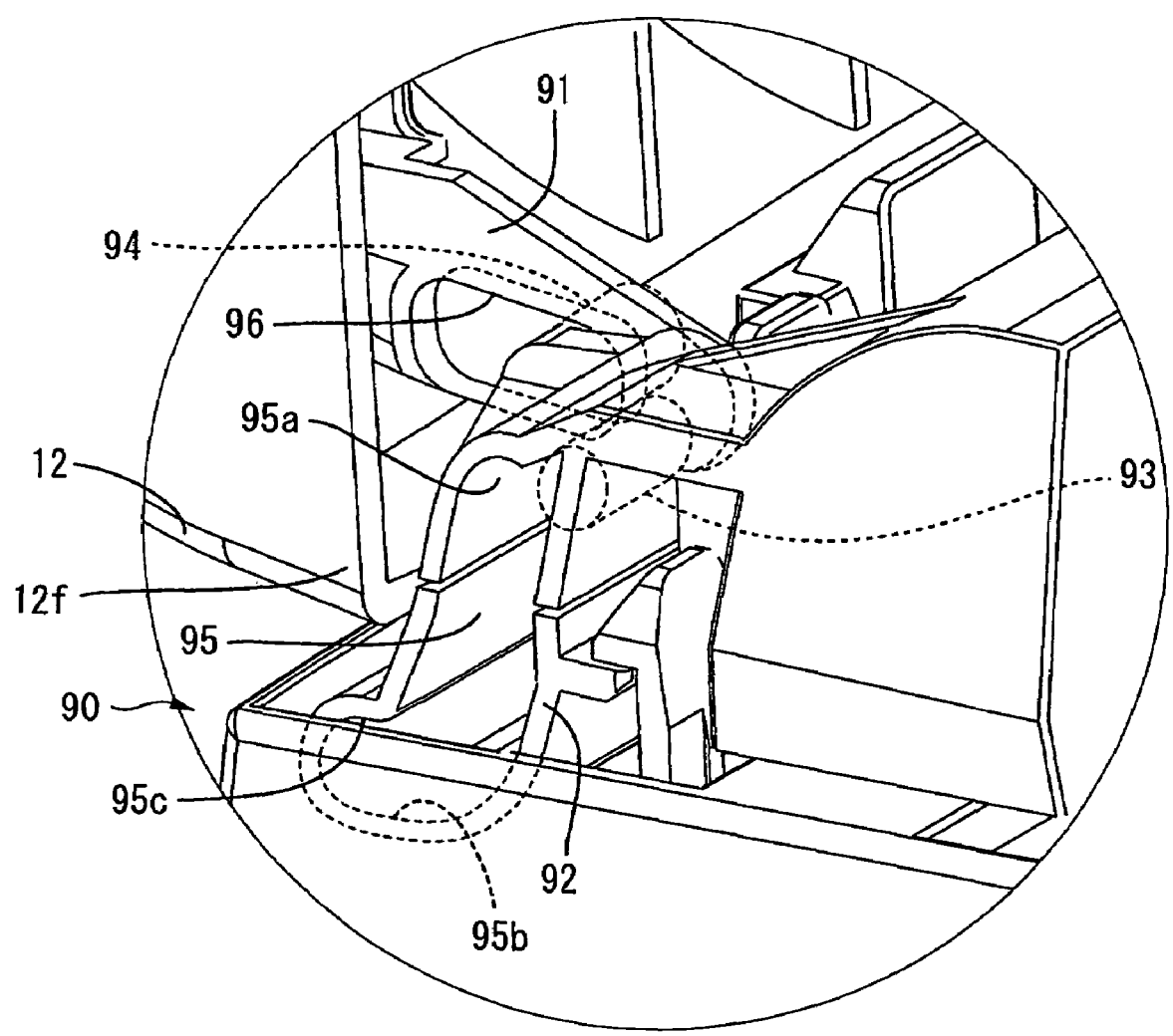
FIG. 12 is an enlarged view of a joint portion between a support section and a fixed section on a frontward-left side.

Meanwhile, FIG. 12 is an enlarged view of a joint portion between the support section 91 and the fixed section 92, both of which are on the frontward-left side in a state in which the cover 12 is in the upright position. The support section 91 projects rearward from the cover 12 in the upright position. The support-section-side pivot shaft 93 is formed in a projection tip end of the support section 91 so as to project to the frontward-left side (to the side toward the fixed section 92). In addition, the support-section-side guide groove 96 is formed in the support section 91 horizontally (along the document transport direction), at a frontward portion in relation to the support-section-side pivot shaft 93. Meanwhile, the fixed section 92 is integrally formed with the document chute section 81. At an upper portion of the fixed section 92, the fixed-section-side pivot shaft 94 projecting to the frontward-right side (to the side toward the support section 91) is fitted into a rearward end of the support-section-side guide groove 96. In addition, the fixed-section-side guide groove 95 is formed in the fixed section 92. The fixed-section-side guide groove 95 is tilted from a rearward position with respect to the fixed-section-side pivot shaft 94, and bent frontward at a lower end portion of the fixed-section-side guide groove 95. The support-section-side pivot shaft 93 is fitted into the uppermost end portion 95a of the fixed-section-side guide groove 95.

Hereinbelow, operations of the present embodiment will be described by reference to FIGS. 7 to 11.

In the state in which the cover 12 is in the face-down position as illustrated in FIG. 8, the support-section-side pivot shaft 93 is in contact with the upper face 95c of the lowermost portion 95b of the fixed-section-side guide groove 95. More specifically, by virtue of this contact, there can be prevented rising of the frontward edge 12f side of the cover 12, which may otherwise occur. The present embodiment is particularly effective since, on the inner face 12a of the cover 12, there is disposed the pinch roller 75 which is to be brought into press-contact with the transport roller 74.

Figure 10:
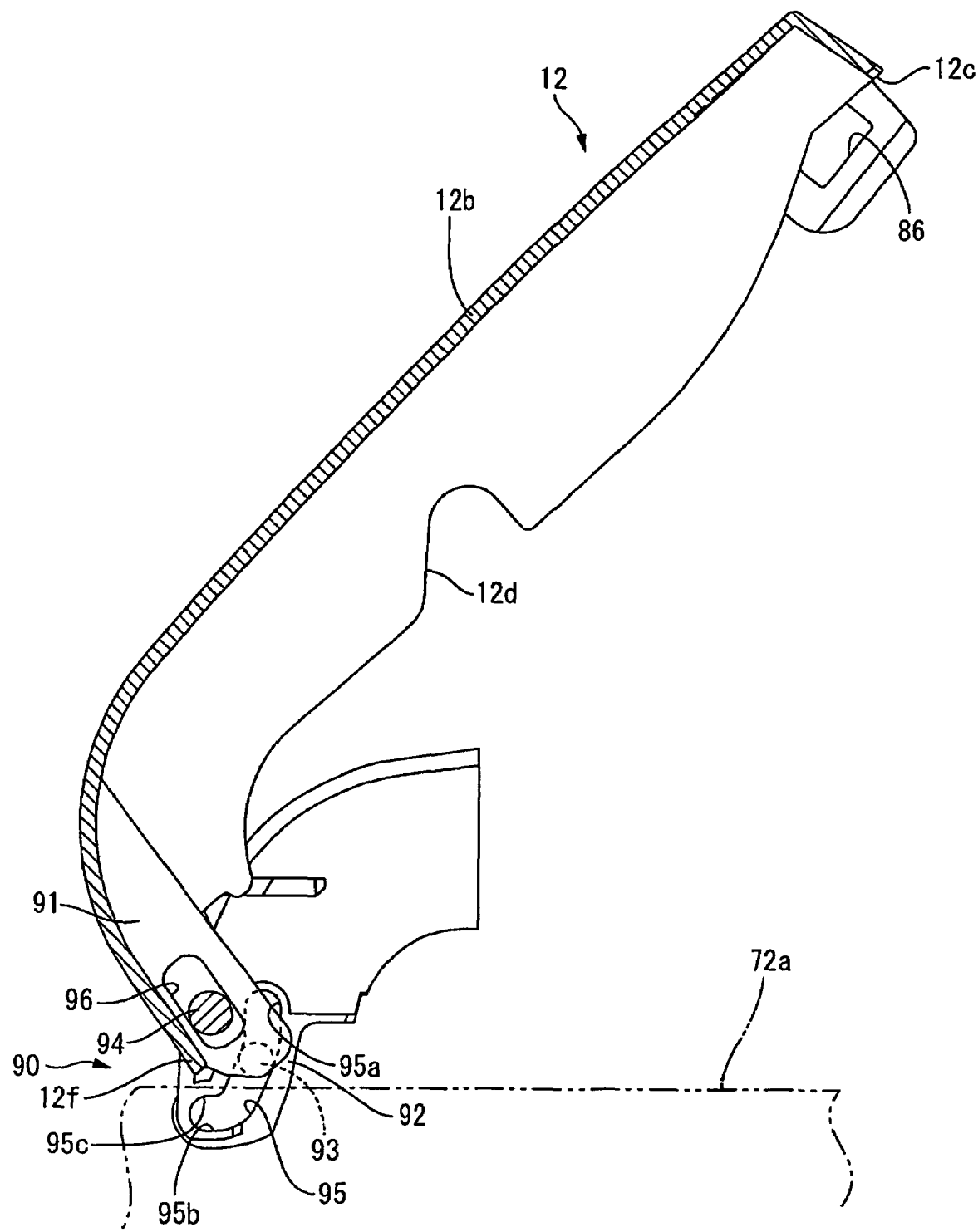
FIG. 10 is a schematic view illustrating the cover during a course of pivot operation.

FIG. 10 is a schematic view illustrating the cover during the course of pivot operation. As illustrated in the drawing, when the cover 12 is gradually pivoted so as to open, the support-section-side pivot shaft 93 is guided upward by the fixed-section-side guide groove 95; and, simultaneously, the fixed-section-side pivot shaft 94 is guided so as approach the support-section-side pivot shaft 93 by means of the support-section-side guide groove 96. As a result, the entire cover 12 is lifted upward, and the frontward edge 12f of the cover 12 starts to pivot without interfering with the upper face 72a of the document ejection tray 72. More specifically, by virtue of cooperation of the above two engagements, the cover 12 is pivoted while the frontward edge 12f of the cover 12 is restricted from being lowered from its initial height.

Figure 11:
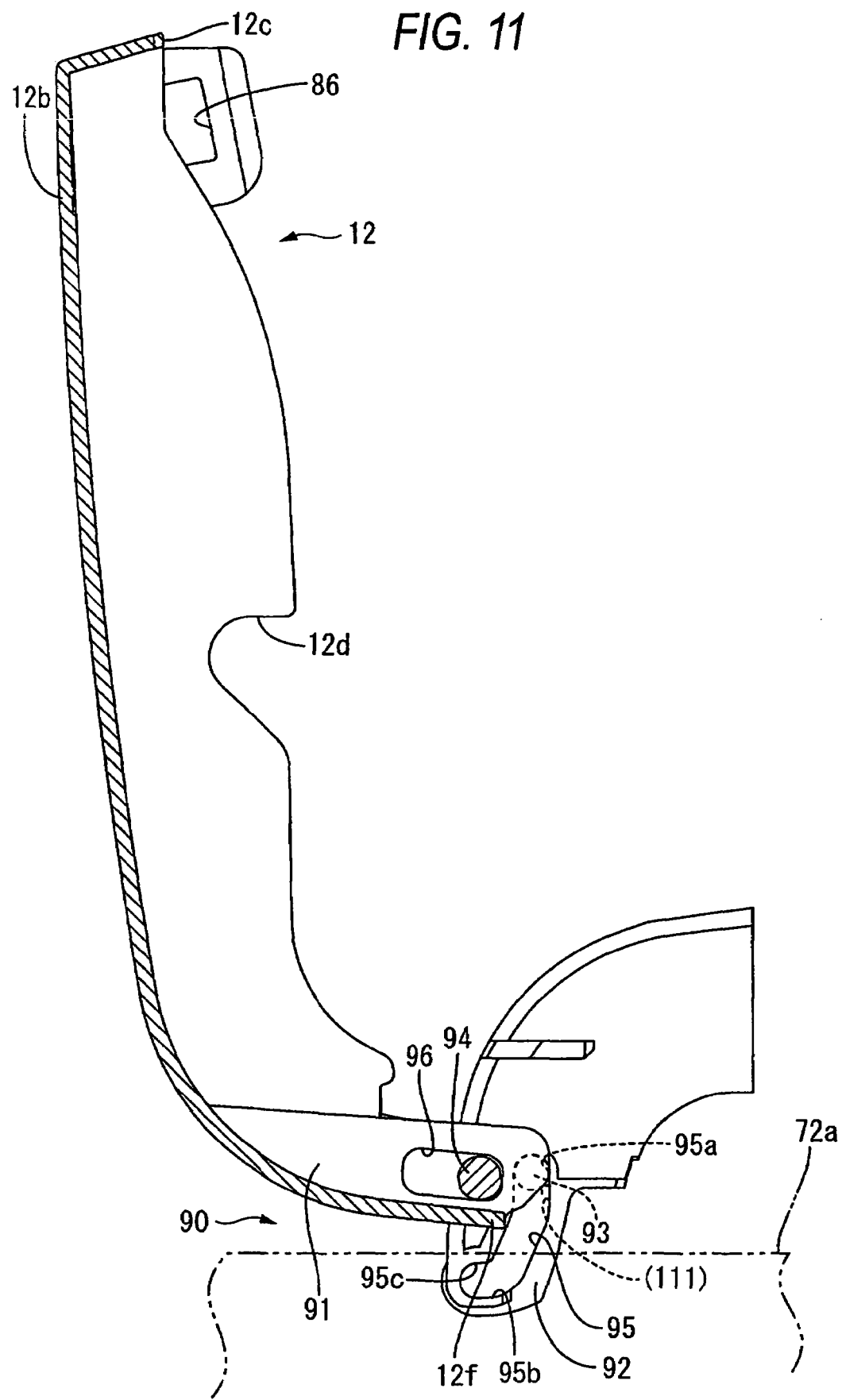
FIG. 11 is a schematic view illustrating the cover in an upright position.

FIG. 11 is a schematic view illustrating the cover in the upright position. As illustrated in the drawing, when the cover 12 is completely open to thus be in the upright position (see FIG. 7), the support-section-side pivot shaft 93 contacts with the uppermost end portion 95a of the fixed-section-side guide groove 95; and, simultaneously, the fixed-section-side pivot shaft 94 contacts with the projection end of the support-section-side guide groove 96, thereby restricting further pivoting of the cover 12. When the cover is closed, the above operations are also performed in reverse order. Similarly, the cover 12 is pivoted without causing the frontward edge 12f to interfere with the upper face 72a of the document ejection tray 72, thereby bringing the cover 12 into the face-down position, as illustrated in FIG. 8, where the lower-end face 12a is in contact with the upper face 72a of the document ejection tray 72 over its entire length. Meanwhile, the "movement-locus plane" referred in the embodiment is a region of a locus of the cover 12 which moves between the face-down position and the upright position as viewed from the depth direction in the plane of FIGS. 9 to 11 which is orthogonal to the document transport direction; and is a plane parallel with the planes of the drawings.

According to the present embodiment, as described above, when the cover 12 is opened, the support-section-side pivot shaft 93 is guided upward by the fixed-section-side guide groove 95; and the fixed-section-side pivot shaft 94 is guided while being restricted in downward movement by the support-section-side guide groove 96 which tilts in accordance with the pivot operation of the cover 12. As a result, interference between the frontward edge 12f of the cover 12 and the upper face 72a of the document ejection tray 72 can be prevented without causing the frontward edge 12f to move downward from its position in the face-down state. In addition, chattering of the cover 12 during the opening/closing operations can also be prevented. Accordingly, in contrast to the configuration of the related-art, formation of a notch in the frontward edge 12f of the cover 12 is no longer needed. In addition, the cover 12 can be placed in the face-down position while bringing the overall length of the lower end face 12e of the cover 12 into contact with the upper face 72a of the document ejection tray 72, thereby enhancing external appearance.

In addition, there is employed such a configuration that the fixed section 92 and the support section 91, which form a set, are adjacently disposed into contact with each other, and the respective pivot shafts (the fixed-section-side pivot shaft 94, the support-section-side pivot shaft 93) are engaged with the guide grooves (the support-section-side guide groove 96, the fixed-section-side guide groove 95). Therefore, displacement in the direction along the pivot shafts (the direction orthogonal to the document transport direction) can be restricted.

Furthermore, in the face-down position, the upper face 95c of the lowermost end portion 95b of the fixed-section-side guide groove 95 along a facing-down direction of the cover 12 is in contact with the support-section-side pivot shaft 93, thereby restricting vertical movement. Accordingly, the pinch roller 75 disposed on the inner face 12a of the cover 12 can be caused to press firmly against the transport roller 74. Furthermore, at this time, the support-section-side pivot shaft 93 is also engaged with the lower face of the lowermost end portion 95b. Accordingly, vertical movement of the cover 12 can be restricted.

Since the hinge section 90 is disposed on each of opposite ends of the cover 12, the cover 12 can be opened/closed stably.

Since the support sections 91 and the support-section-side pivot shaft 93 are formed integrally with the cover 12, manufacturing cost can be lowered, and the assembly processes can be simplified.

The present invention is not limited to the embodiment explained by reference to the above descriptions and drawings. For instance, the following embodiments are also included within the scope of the invention. In addition, other than those described hereinbelow, the invention may be implemented while applying various modifications without departing from the scope of the invention.

The embodiment has been configured such that the fixed-section-side guide groove 95 is formed to penetrate the support section 91; and the support-section-side guide groove 96 is formed to penetrate the fixed section 92, respectively. However, the configuration of the grooves is not limited thereto, and may be closed-end grooves. In addition, the fixed-section-side guide groove 95 is not necessarily a groove and may be a guide hole (maybe either a though hole or a closed-end hole), so long as it is engaged with the support-section-side pivot shaft 93, thereby guiding the support-section-side pivot shaft 93 in a direction departing from the document ejection tray 72 as the cover 12 moves from the face-down position to the upright position. In addition, the support-section-side guide groove 96 is not necessarily a groove and may be a guide hole (may be either a though hole or a closed-end hole), so long as it is engaged with the fixed-section-side pivot shaft 94, thereby guiding the fixed-section-side pivot shaft 94 so as to approach support-section-side pivot shaft 93 as the cover 12 moves from the face-down position to the upright position.

When the above embodiment is further configured such that, in the face-down position, the fixed-section-side pivot shaft 94 contacts with the uppermost end portion of the support-section-side guide groove 96, the vertical movement of the cover can be restricted further.

The present embodiment may be configured so that the pair of fixed sections 92, 92 are brought into contact with opposing faces of the respective support sections 91.

Reference numeral 110 in FIG. 9 denotes a restrictive projection corresponding to the first restriction section described in the claims. The restrictive projection 110 is formed, in front of the lowermost end portion 95b of the fixed-section-side guide groove 95, so as to become narrower than the other elements. The restrictive projection 110 contacts with the support-section-side pivot shaft 93 in the face-down position, thereby attaining temporary retention of the cover 12 in the face-down position.

In FIG. 11, reference numeral 111 denotes a restrictive projection corresponding to the second restriction section described in the claims. The restrictive projection 111 is formed on the fixed-section-side guide groove 95 at a position below the uppermost end portion 95a, and has a width narrower than that of other portions. The restrictive projection 111 contacts with the support-section-side pivot shaft 93 in the upright position, thereby attaining temporary retention of the cover 12 in the upright position.

In the embodiment, an example where the hinge device of the invention is adopted to the joint portion of the cover 12 has been described. However, the embodiment is not limited thereto, and similar effects can be yielded when the same is adopted to a joint portion between the scanning unit and the image forming unit 2, a joint portion between the ADF 5 and the image scanner 4, or the like. Furthermore, as a matter of course, the hinge device of the invention may be employed as a joint portion between a movable member—which is disposed pivotably between a face-down position and an upright position in relation to a main body of another apparatus—and the main body.

Meanwhile, the fixed section may be formed either independently of the main body, or integrally therewith. The support section may be formed either independently of one end of the pivot member, or integrally therewith.

Example configurations of the first restriction section and the second restriction section include the followings:
(a) A configuration in which guide holes (a fixed-section-side guide hole and a support-section-side guide hole) are employed as guide grooves, and an elastically-deformable restriction projection is formed on at least one face of opposing faces of the guide grooves to project therefrom, thereby providing a narrow-width portion; and
(b) A configuration in which, on faces of guide holes (a fixed-section-side guide hole and a support-section-side guide hole) on which pivot shafts (a support-section-side pivot shaft and a fixed-section-side pivot shaft) slide, there are provided cavities which can accommodate the pivot shafts.

The automatic document feeder may be either detachably mounted on the main body, such as a document scanning device or an image forming apparatus (e.g., a printer, a facsimile apparatus, or a multifunction machine having a printing function, a scanning function, and the like), or non-detachably mounted on the same.

Examples of the recording medium include an OHP sheet, a sheet of paper, and the like.

The image forming apparatus is not limited to a printing apparatus, such as a printer (a laser printer), and may be a multifunction machine having a plurality of functions including a printing function, a scanning function, a facsimile function, and the like.

The hinge device may be configured as follows.
(A) A configuration in which the fixed-section-side guide hole has a plane that is to be engaged with the support-section-side pivot shaft in a state in which the movable member is in the face-down position, the plane being in parallel with a direction along a surface of the movable member in the face-down position.
(B) A configuration in which the fixed-section-side pivot shaft contacts with an end portion of the support-section-side guide hole in a state in which the movable member is in the face-down position, the end portion being distant from the main body.

According to the configuration of (A), when the movable member is in the face-down position, the support-section-side pivot shaft is engaged with a plane parallel with the face-down direction. Therefore, in the face-down state, movement of the movable member in the direction departing from the main body (the direction orthogonal to the face-down direction); that is, rising of the movable member in relation to the main body, can be restricted. In particular, some image forming apparatus, such as a multifunction machine, are configured to include a mechanism—e.g., a pinch roller for transporting a document—for urging a movable member in a face-down position from below to above. The invention is particularly effective for such a configuration, by virtue of being capable of maintaining a pressing condition between the movable member and the pinch roller, and the like.

According to the configuration of (B), in the state in which the movable member is in the face-down position, the fixed-section-side pivot shaft contacts with an end portion of the support-section-side guide hole, which end portion is distant from the main body. Hence, even the movement of the movable member in a direction along which the movable member approaches the main body can be restricted.

According to the aforementioned configurations, by means of utilizing the hinge device according to the embodiment, the geometry of the cover serving as the movable member can be caused to conform with the opposing section of the main body. For instance, when the opposing section of the main body is of a planar shape, the opposing face of the cover is formed into a straight line conforming thereto. As a result, there can be eliminated a gap between the cover and the main body in a state in which the cover is closed, which gap may otherwise be created, thereby enhancing external appearance.

The foregoing description of the embodiment has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A hinge device for pivotably joining a main body of an equipment and one end of a movable member to enable the movable member to move between a face-down position and an upright position, the hinge device comprising:
   a fixed section that is fixed on the main body of the equipment;
   a support section that supports the movable member;
   a support-section-side pivot shaft that is disposed in the support section and extends along a direction orthogonal to a movement-locus plane where the movable member passes; and
   a fixed-section-side pivot shaft that is disposed in the fixed section and extends along the orthogonal direction,
   wherein the fixed section is provided with a fixed-section-side guide hole that engages with the support-section-side pivot shaft and guides the support-section-side pivot shaft in a direction departing from the main body as the movable member moves from the face-down position to the upright position, and
   wherein the support section is provided with a support-section-side guide hole that engages with the fixed-section-side pivot shaft at a position displaced toward one end of the movable member in relation to an engagement position between the support-section-side pivot shaft and the fixed-section-side guide hole, the support-section-side guide hole guiding the fixed-section-side pivot shaft to approach the support-section-side pivot shaft as the movable member moves from the face-down position to the upright position.

2. The hinge device according to claim 1, wherein the fixed-section-side guide hole is an arc-shaped guide groove having a geometry of an arc that is curved along a pivot direction of the movable member, and
   wherein the support-section-side guide hole is a straight-shaped guide groove that is located above the support-section-side pivot shaft in a state in which the movable member is in the face-down position, the straight-shaped guide groove having a geometry of a straight line along a facing direction of the movable member and the main body.

3. The hinge device according to claim 1, wherein the fixed section is provided as a fixed section pair formed from a pair of fixed sections,
   wherein the support section is provided as a support section pair formed from a pair of support sections that are respectively disposed adjacently on opposing faces or back faces of the pair of fixed sections,
   wherein each of the support-section-side pivot shafts of the pair of support sections projects toward the pair of fixed sections that are disposed adjacent to the pair of support sections to be engaged in the respective fixed-section-side guide holes of the pair of fixed sections, and
   wherein each of the fixed-section-side pivot shafts of the pair of fixed sections projects toward the pair of support sections that are disposed adjacent to the pair of fixed sections to be engaged in the respective support-section-side guide holes of the pair of support sections.

4. The hinge device according to claim 1, wherein the fixed-section-side guide hole has a plane that is to be engaged with the support-section-side pivot shaft in a state in which the movable member is in the face-down position, the plane being in parallel with a direction along a surface of the movable member in the face-down position.

5. The hinge device according to claim 4, wherein the fixed-section-side pivot shaft contacts with an end portion of the support-section-side guide hole in a state in which the movable member is in the face-down position, the endportion being distant from the main body.

6. The hinge device according to claim 1, wherein the fixed-section-side guide hole is provided with a first restriction section that restricts movement of the support-section-side pivot shaft in a state where the movable member is in the face-down position.

7. The hinge device according to claim 1, wherein the support-section-side guide hole is provided with a third restriction section that restricts movement of the fixed-section-side pivot shaft in a state where the movable member is in the face-down position.

8. The hinge device according to claim 1, wherein the fixed-section-side guide hole is provided with a second restriction section that restricts movement of the support-section-side pivot shaft in a state where the movable member is in the upright position.

9. The hinge device according to claim 1, wherein the support-section-side guide hole is provided with a fourth restriction section that restricts movement of the fixed-section-side pivot shaft in a state where the movable member is in the upright position.

10. An automatic document feeder comprising:
    a main body;
    a document placement section on which a document is placed; and a document transport unit that transports the document placed on the document placement section and includes:
 a transport roller that is disposed on one end of the document placement section and contacts with the document placed thereon to transport the document;
 a cover that has a geometry of covering the transport roller;
 a hinge device that pivotably joins the main body and one end of the cover to enable the cover to move between a face-down position and an upright position; and
 a pinch roller that is disposed on the cover and is pressed by the transport roller in a state in which the cover is in the face-down position in relation to the main body,
wherein the cover has an opposing face that faces the main body in a state in which the cover is in the face-down position, the opposing face having a geometry conforming to an opposing section of the main body,
wherein the hinge device includes:
 a fixed section that is fixed on the main body;
 a support section that supports the cover;
 a support-section-side pivot shaft that is disposed in the support section and extends along a direction orthogonal to a movement-locus plane where the cover passes; and
 a fixed-section-side pivot shaft that is disposed in the fixed section and extends along the orthogonal direction,
wherein the fixed section is provided with a fixed-section-side guide hole that engages with the support-section-side pivot shaft and guides the support-section-side pivot shaft in a direction departing from the main body as the cover moves from the face-down position to the upright position, and
wherein the support section is provided with a support-section-side guide hole that engages with the fixed-section-side pivot shaft at a position displaced toward one end of the cover in relation to an engagement position between the support-section-side pivot shaft and the fixed-section-side guide hole, the support-section-side guide hole guiding the fixed-section-side pivot shaft to approach the support-section-side pivot shaft as the cover moves from the face-down position to the upright position.

11. The automatic document feeder according to claim 10, wherein the hinge device is disposed on the cover at each of opposite ends in a direction orthogonal to the movement-locus plane.

12. The automatic document feeder according to claim 10, wherein the cover, the support section, and the support-section-side pivot shaft are integrally formed.

13. A scanning unit comprising:
a main body;
a document placement section on which a document is placed;
a document transport unit that transports the document placed on the document placement section and includes:
 a transport roller that is disposed on one end of the document placement section and contacts with the document placed thereon to transport the document;
 a cover that has a geometry of covering the transport roller;
 a hinge device that pivotably joins the main body and one end of the cover to enable the cover to move between a face-down position and an upright position; and
 a pinch roller that is disposed on the cover and is pressed by the transport roller in a state in which the cover is in the face-down position in relation to the main body; and
an image scanner that is provided with a scanning section that scans an image of the document transported by the document transport unit,
wherein the cover has an opposing face that faces the main body in a state in which the cover is in the face-down position, the opposing face having a geometry conforming to an opposing section of the main body,
wherein the hinge device includes:
 a fixed section that is fixed on the main body;
 a support section that supports the cover;
 a support-section-side pivot shaft that is disposed in the support section and extends along a direction orthogonal to a movement-locus plane where the cover passes; and
 a fixed-section-side pivot shaft that is disposed in the fixed section and extends along the orthogonal direction,
wherein the fixed section is provided with a fixed-section-side guide hole that engages with the support-section-side pivot shaft and guides the support-section-side pivot shaft in a direction departing from the main body as the cover moves from the face-down position to the upright position, and
wherein the support section is provided with a support-section-side guide hole that engages with the fixed-section-side pivot shaft at a position displaced toward one end of the cover in relation to an engagement position between the support-section-side pivot shaft and the fixed-section-side guide hole, the support-section-side guide hole guiding the fixed-section-side pivot shaft to approach the support-section-side pivot shaft as the cover moves from the face-down position to the upright position.

14. An image forming apparatus comprising:
a main body;
a document placement section on which a document is placed;
a document transport unit that transports the document placed on the document placement section and includes:
 a transport roller that is disposed on one end of the document placement section and contacts with the document placed thereon to transport the document;
 a cover that has a geometry of covering the transport roller;
 a hinge device that pivotably joins the main body and one end of the cover to enable the cover to move between a face-down position and an upright position; and
 a pinch roller that is disposed on the cover and is pressed by the transport roller in a state in which the cover is in the face-down position in relation to the main body;
an image scanner that is provided with a scanning section that scans an image of the document transported by the document transport unit; and
an image forming unit that forms on a recording medium the image scanned by the scanning unit,
wherein the cover has an opposing face that faces the main body in a state in which the cover is in the face-down position, the opposing face having a geometry conforming to an opposing section of the main body,
wherein the hinge device includes:
 a fixed section that is fixed on the main body;
 a support section that supports the cover;

a support-section-side pivot shaft that is disposed in the support section and extends along a direction orthogonal to a movement-locus plane where the cover passes; and a fixed-section-side pivot shaft that is disposed in the fixed section and extends along the orthogonal direction, wherein the fixed section is provided with a fixed-section-side guide hole that engages with the support-section-side pivot shaft and guides the support-section-side pivot shaft in a direction departing from the main body as the cover moves from the face-down position to the upright position, and wherein the support section is provided with a support-section-side guide hole that engages with the fixed-section-side pivot shaft at a position displaced toward one end of the cover in relation to an engagement position between the support-section-side pivot shaft and the fixed-section-side guide hole, the support-section-side guide hole guiding the fixed-section-side pivot shaft to approach the support-section-side pivot shaft as the cover moves from the face-down position to the upright position.

* * * * *